US009454835B2

(12) United States Patent
Fields et al.

(10) Patent No.: US 9,454,835 B2
(45) Date of Patent: Sep. 27, 2016

(54) SYSTEM AND METHOD FOR DISPLAYING AND MANIPULATING A FLOOR LAYOUT DISPLAY ON A COMPUTER

(71) Applicant: Milliken & Company, Spartanburg, SC (US)

(72) Inventors: Adam Fields, Greer, SC (US); Barbara Lynn Haaksma, Greer, SC (US); Stacy Walker, Greenville, SC (US); Robert M. MacMeccan, Greer, SC (US); Lawrence Keith Seitz, Jr., Lyman, SC (US); Cresta A. Martin, Atlanta, GA (US)

(73) Assignee: Milliken & Company, Spartanburg, SC (US)

(*) Notice: Subject to any disclaimer, the term of this patent is extended or adjusted under 35 U.S.C. 154(b) by 572 days.

(21) Appl. No.: 13/775,287

(22) Filed: Feb. 25, 2013

(65) Prior Publication Data

US 2013/0222423 A1 Aug. 29, 2013

Related U.S. Application Data

(60) Provisional application No. 61/604,602, filed on Feb. 29, 2012.

(51) Int. Cl.
 *G06T 11/60* (2006.01)
 *G06T 19/00* (2011.01)
 (Continued)

(52) U.S. Cl.
 CPC .......... *G06T 11/60* (2013.01); *A47G 27/0275* (2013.01); *G06F 3/0486* (2013.01); *G06F 3/04845* (2013.01); *G06F 9/4443* (2013.01); *G06Q 10/043* (2013.01);
 (Continued)

(58) Field of Classification Search
 None
 See application file for complete search history.

(56) References Cited

U.S. PATENT DOCUMENTS 5,966,454 A 10/1999 Thomas et al.
6,459,435 B1 10/2002 Eichel
(Continued)

FOREIGN PATENT DOCUMENTS

WO WO 02/091198 A1 11/2002
WO WO 2010/062979 A2 6/2010

OTHER PUBLICATIONS

Using Adobe Photoshop Lightroom. Jun. 29, 2011, XP055005938.
(Continued)

*Primary Examiner* — Maurice L McDowell, Jr.
*Assistant Examiner* — Donna J Ricks
(74) *Attorney, Agent, or Firm* — Brenda D. Wentz

(57) ABSTRACT

A graphic display on a computer system with a floor layout having a canvas layer and an overlay layer. The canvas layer has tile graphics laid out in a grid, the tile graphics representing portions of the floor. The overlay layer has overlay containers corresponding to the tile graphics, the overlay layer having overlay zones and overlay graphics. Overlay functions associated with overlay zones in an overlay container manipulate the tile graphic associated with the overlay container. The overlay graphics of each overlay container are transparent until a hover event occurs over the associated overlay container. A tile pallet illustrates the tile graphics in the canvas layer of the floor layout. A tool layout display includes indicia associated with various functions that can manipulate the tile graphics in the flooring layout. A perspective flooring layout is displayed in a transparent window of an environmental mask with a perspective room design.

31 Claims, 7 Drawing Sheets

(51) Int. Cl.

| | | |
|---|---|---|
| *A47G 27/02* | (2006.01) | |
| *G06Q 10/04* | (2012.01) | |
| *G06F 3/0486* | (2013.01) | |
| *G06T 11/00* | (2006.01) | |
| *G06T 19/20* | (2011.01) | |
| *G06F 3/0484* | (2013.01) | |
| *G06F 9/44* | (2006.01) | |

(52) U.S. Cl.
CPC ............ *G06T 11/001* (2013.01); *G06T 19/00* (2013.01); *G06T 19/20* (2013.01); *G06T 2210/04* (2013.01); *G06T 2219/2024* (2013.01)

(56) References Cited

U.S. PATENT DOCUMENTS

| | | | |
|---|---|---|---|
| 6,572,377 B2 | 6/2003 | Masters | |
| 6,664,972 B2 | 12/2003 | Eichel et al. | |
| 6,931,600 B1 | 8/2005 | Pittman | |
| 7,072,733 B2 | 7/2006 | McGee et al. | |
| 7,246,044 B2 | 7/2007 | Imamura et al. | |
| 7,277,572 B2 | 10/2007 | MacInnes et al. | |
| 7,484,183 B2 | 1/2009 | Look et al. | |
| 7,523,411 B2 | 4/2009 | Carlin | |
| 7,661,958 B2 | 2/2010 | Meyer et al. | |
| 7,801,114 B1 | 9/2010 | Croak et al. | |
| 8,010,906 B1 | 8/2011 | Sinnard et al. | |
| 2002/0123942 A1 | 9/2002 | Bridges, Jr. et al. | |
| 2002/0175942 A1* | 11/2002 | Seitz, Jr. | A47G 27/0275 715/764 |
| 2006/0080125 A1 | 4/2006 | Shipman | |
| 2008/0180457 A1* | 7/2008 | Yamazaki | G06F 3/0482 345/619 |
| 2008/0281561 A1 | 11/2008 | Shulman et al. | |
| 2010/0302595 A1* | 12/2010 | Yamada | G06K 9/4642 358/1.18 |
| 2011/0029401 A1 | 2/2011 | Granger et al. | |
| 2011/0179066 A1 | 7/2011 | Cardno et al. | |
| 2011/0219339 A1 | 9/2011 | Densham | |
| 2011/0234630 A1* | 9/2011 | Batman | G06F 19/321 345/629 |
| 2012/0042271 A1* | 2/2012 | Ma | G06F 9/4443 715/768 |
| 2012/0265758 A1* | 10/2012 | Han | G06F 17/30038 707/737 |
| 2013/0113904 A1* | 5/2013 | Wang | A61B 1/0005 348/65 |

OTHER PUBLICATIONS http://www.homestyler.com; Autodesk Homestyler online home design website, Copyright 2012.

International Search Report. International application No. PCT/US2013/027900. International filing date—Feb. 27, 2013.

\* cited by examiner

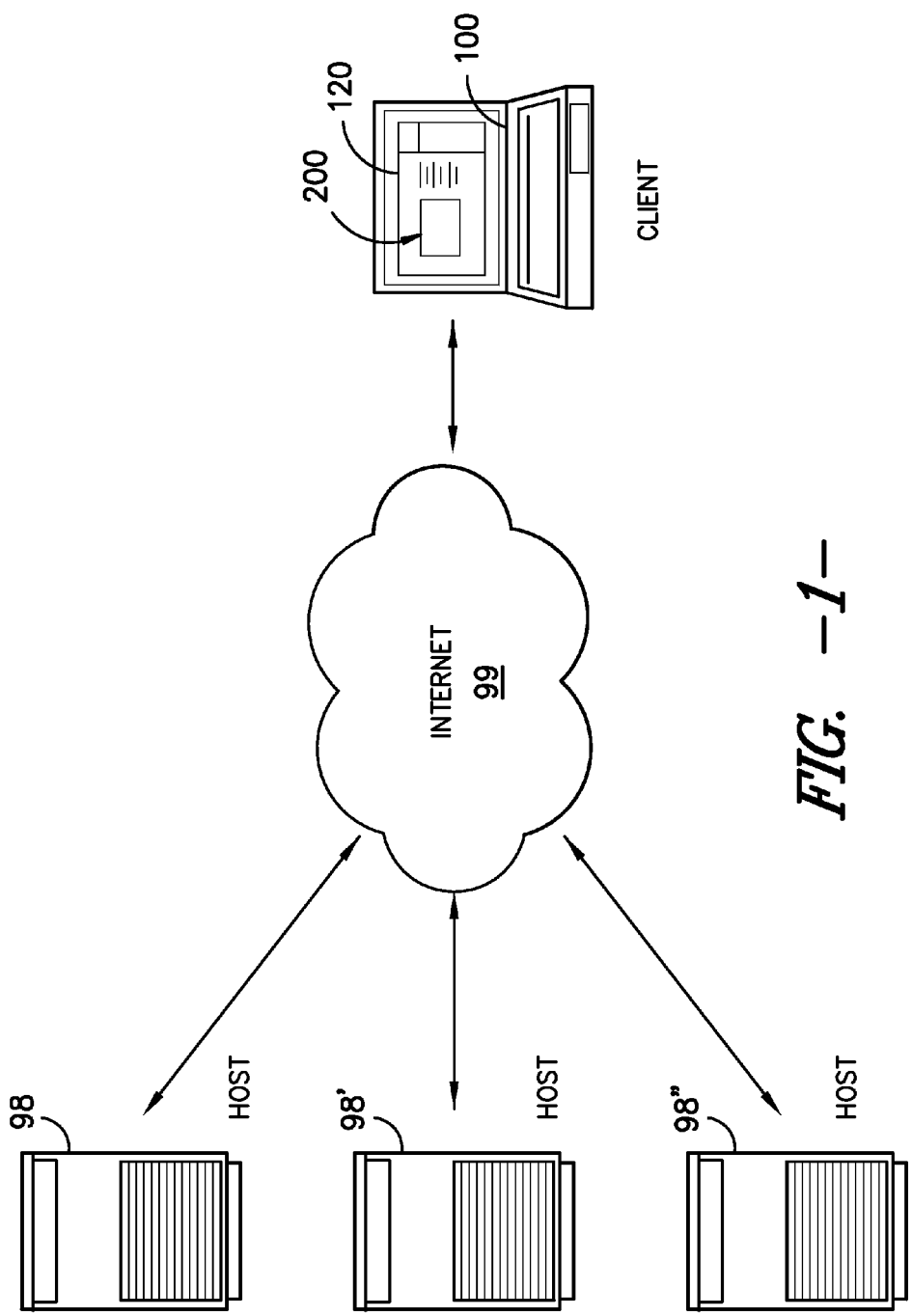
FIG. -1-

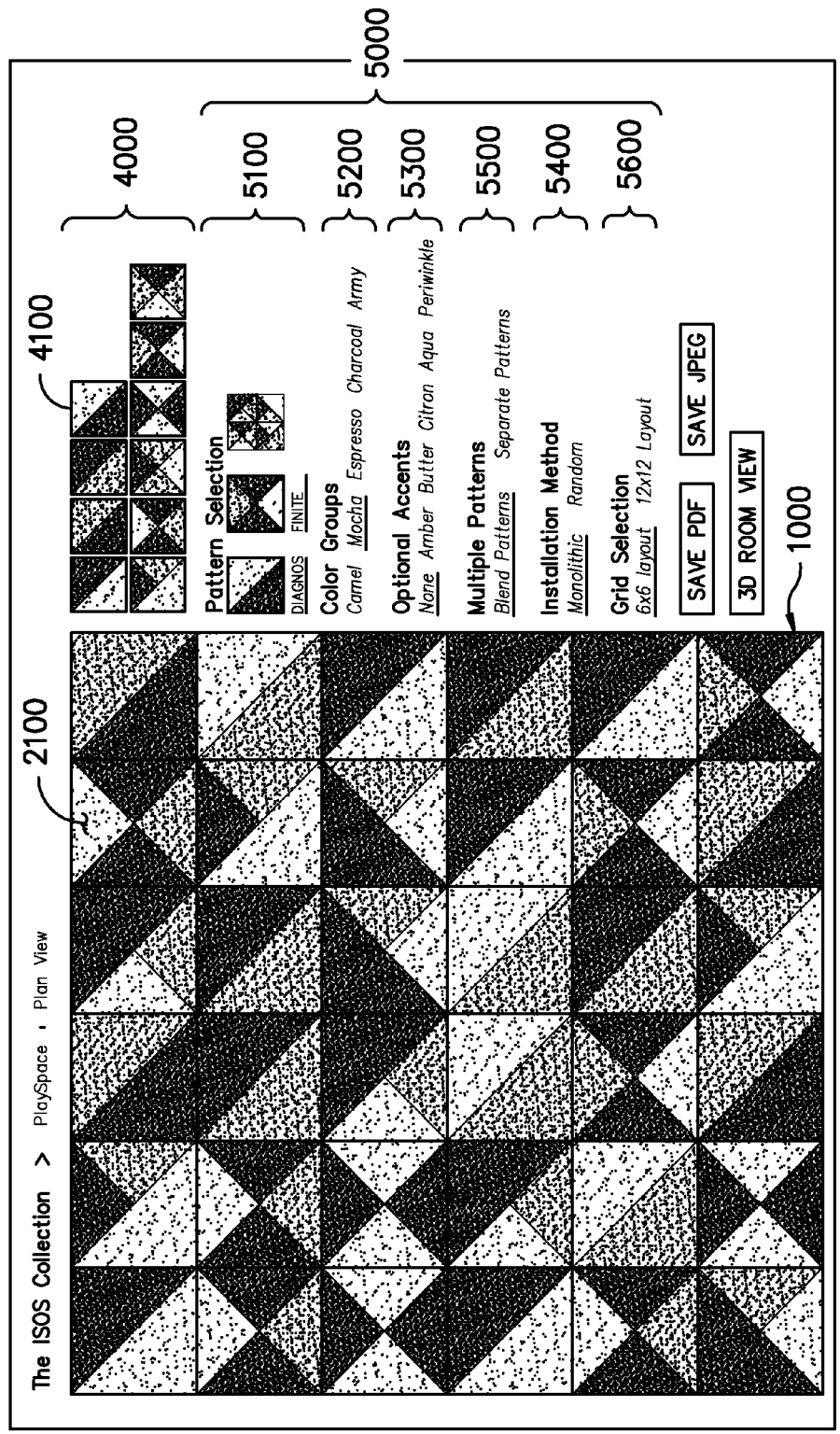
FIG. -2-

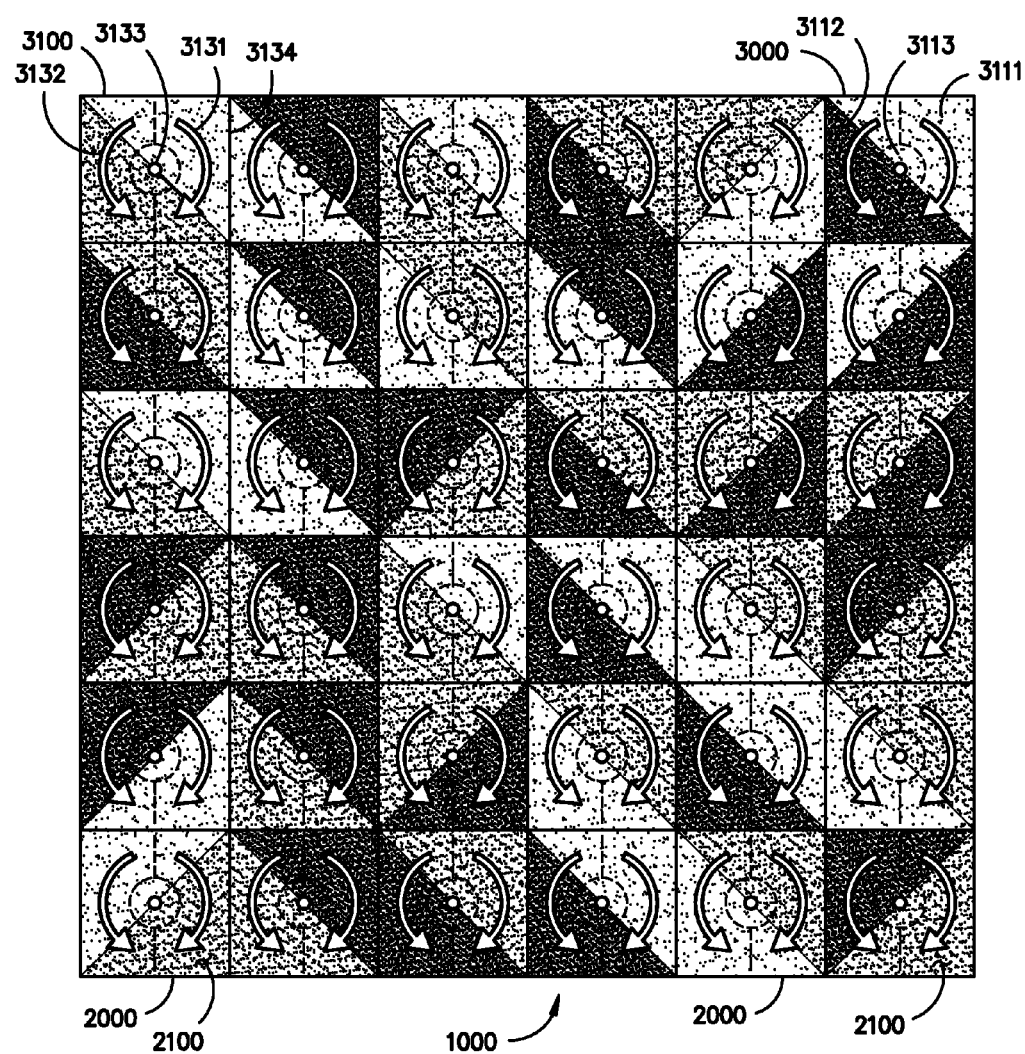
FIG. —3—

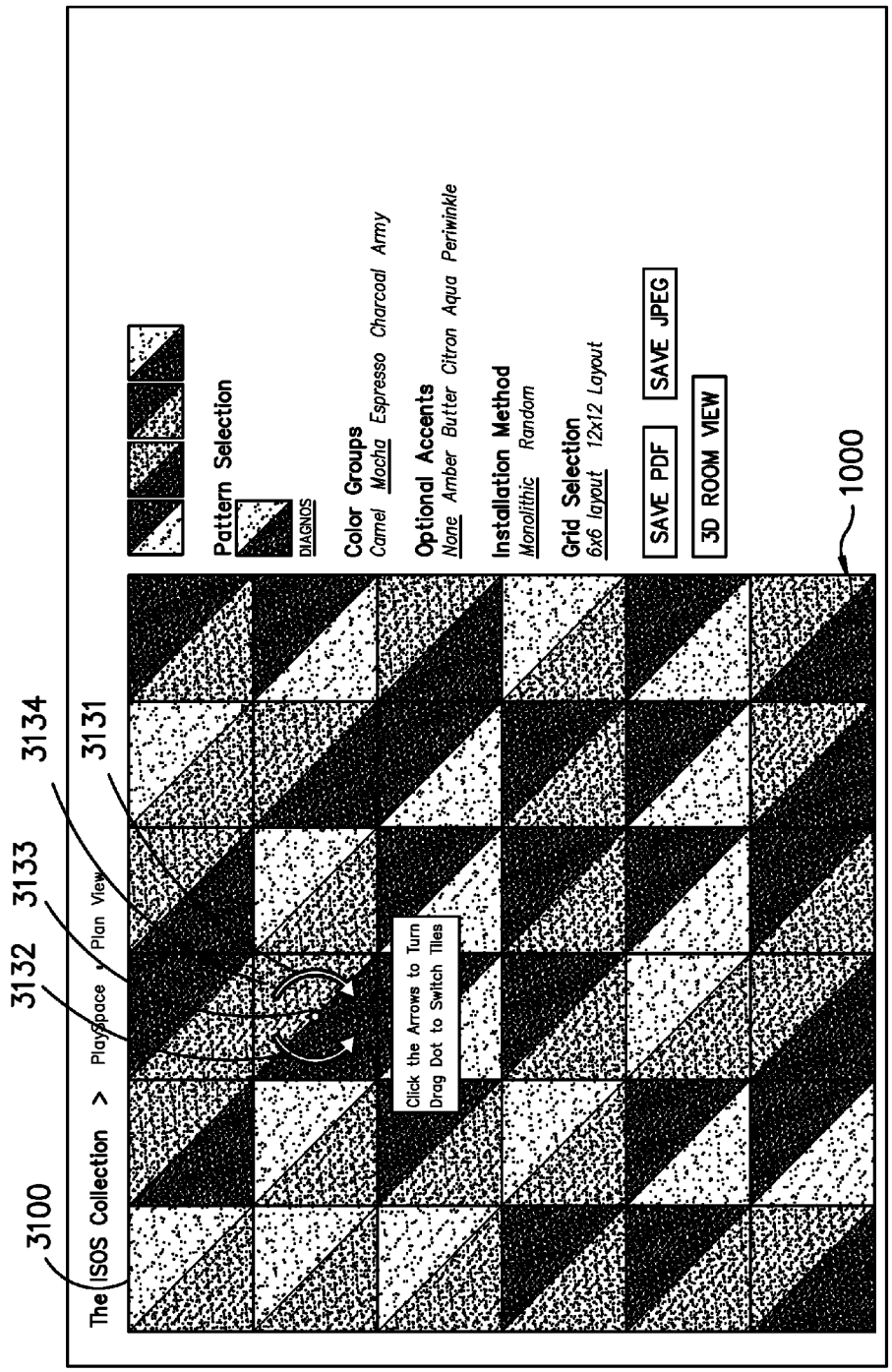
FIG. -4-

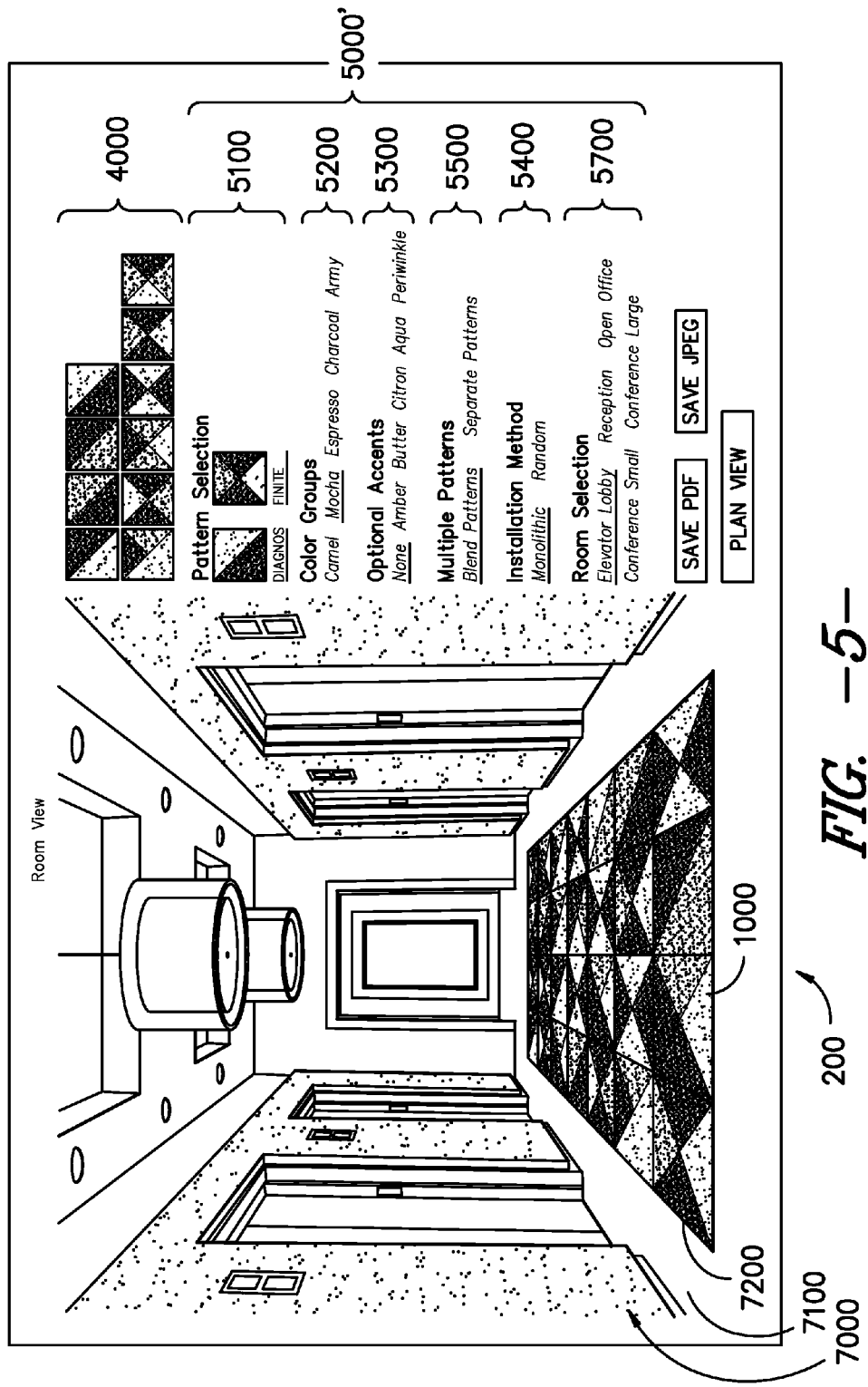
FIG. —5—

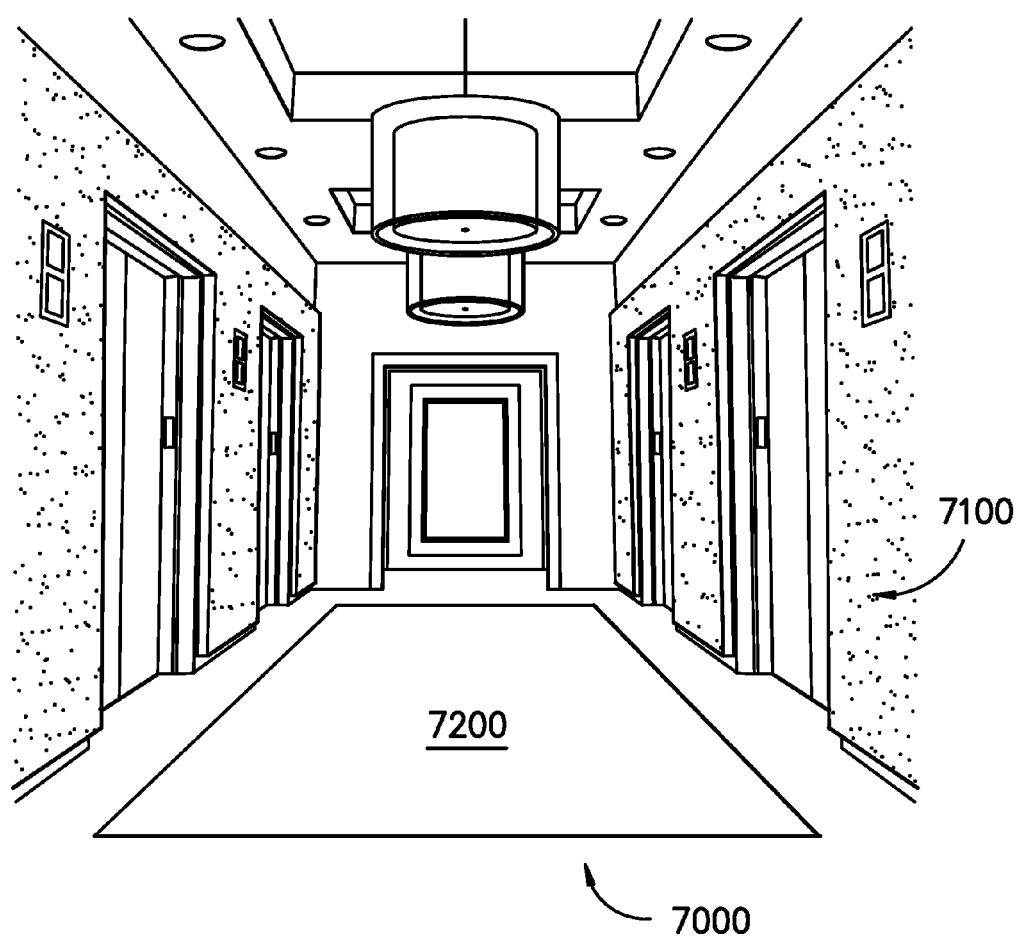
FIG. —6—

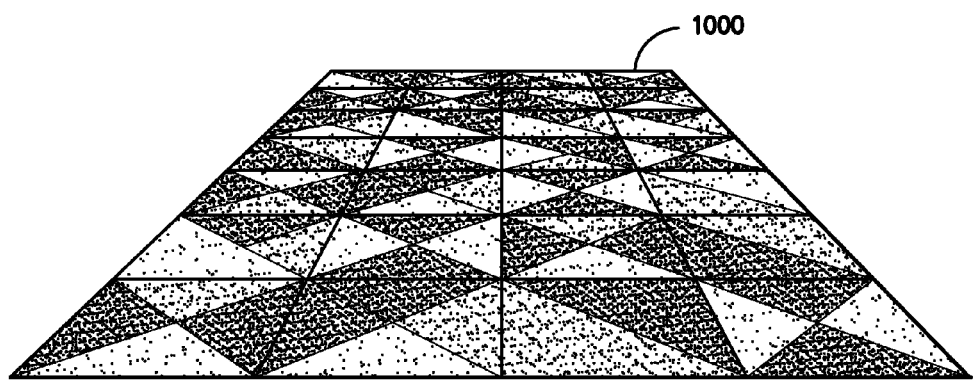
FIG. -7-

SYSTEM AND METHOD FOR DISPLAYING AND MANIPULATING A FLOOR LAYOUT DISPLAY ON A COMPUTER

CROSS REFERENCE TO RELATED APPLICATIONS

This application claims priority to U.S. Provisional Patent Application No. 61/604,602, entitled "System and Method for Displaying and Manipulating a Floor Layout Display on a Computer" which was filed on Feb. 29, 2012.

TECHNICAL FIELD

The present invention generally relates to a system and method for displaying a graphic display on the monitor of a computer system, and in particular, for displaying a flooring layout or room scene with a flooring layout.

BACKGROUND

In designing a floor with carpet or carpet tile, a customer will typically need to view the carpet by physically having representative carpet tiles that can be rearranged to the potential layout, or use a computer design system that is cumbersome or has limited ability to interact in real time with the carpet tile patterns, color schemes, accents, placement, and orientations. Additionally, use of the computer design system will create limits on the ability of the customer to visualize the potential layout in various environments.

Therefore, there is a need for an improved process, method, and product that provide a user with the ability to design and interact in real time with graphic representations on a computer of floor covering designs, colors, and layouts, in both a two dimensional view and a three dimensional perspective view.

BRIEF DESCRIPTION OF THE DRAWINGS

For purposes of illustration only, the present invention can be further understood with reference to the following drawings;

FIG. 1 is an illustration of a computer system with a monitor for use in the present invention;

FIG. 2 is an illustration of a graphic display on the computer monitor, showing an embodiment of subject design layout display, a pallet display, and a tool layout display;

FIG. 3 is an illustration of the subject design layout display from FIG. 2, with the overlay container zones and graphics visible for illustrative purposes;

FIG. 4 is an illustration of an embodiment of the graphic display from FIG. 2, with the overlay graphics of a single overlay container activated by a hover event;

FIG. 5 is an illustration of an alternative graphic display, an environmental mask, such as a room scene, with a window in which to display the subject design layout display, such as a floor layout, and the environmental mask and subject design layout being in a three dimensional perspective view;

FIG. 6 is an illustration of the environment mask from FIG. 5;

FIG. 7 is an illustration of the subject design layout, or flooring layout, from FIG. 5.

DETAILED DESCRIPTION

The following examples further illustrate the subject matter described above but, of course, should not be construed as in any way limiting the scope thereof.

Referring now to the figures, and in particular to FIG. 1, the present invention provides a system and method for displaying a graphic display 200 including a flooring layout or room scene with a flooring layout, on a display screen or monitor 120 of a computer system 100. The computer system 100 includes a hover event, a drag event, and a computer activation event. The drag function has a start point and a finish point.

For some computer devices, such as a standard computer with a mouse controlling a curser, the hover event occurs wherever a curser is positioned in the desired location in the display of the monitor. In such devices, the start point of the drag function can occur at the location of the curser upon the down click of a mouse button, with the finish point occurring at the location of the curser upon the up click of the mouse button. A computer activation event on such a device will typically occur in the location of the curser upon the up click of the mouse button.

For some computer devices, such as a touch device computer, the hover event occurs at the location that a tap pressure is applied to the monitor or display screen of the device. For such devices, the start point of a drag function can occur at the initial point of contact or application of pressure to the monitor of the device, with the finish point occurring at the location on the monitor where the contact or pressure is removed from the monitor after movement across the display screen. A computer activation event on such a device will typically occur in the location in which a quick tap, or application and release of pressure, is applied to the display screen.

Still referring to FIG. 1, a computer program and computer files are used by the computer system 100 for creating and manipulating the graphic display 200 on the monitor 120. Typically, when the computer 100 is connected to the internet 99 and sends a request to a host computer 98 for a page displaying the graphic display 200, the computer program instructions and files are downloaded from the host computer 98, or host computers 98, 98', and 98", over the internet 99 to the computer 100 as a "client" computer. The computer 100 then places the program instructions and files in the computer 100, a processor of processors of the computer use the program instructions and files to generate the graphic display 200 on the monitor 120. The program instructions can be coded in languages such as HTML5, CSS3, Javascript, jQuery 1.7 and above, JSON, and any other language that would allow computer 100 to create the graphic display 200 and enable the functionalities. The downloaded program instructions operate within a standard browse in the computer 100, such as Google Chrome 16 or higher, Apple Safari 5 or higher, Mozilla Firefox 10 and higher, and Microsoft IE 7 (with Google Chrome Frame) or higher. During a session of using the graphic display 200, the computer 100 can return to the host computer 98, or host computers 98, 98', and 98", over the internet 99 to obtain additional computer program instructions and/or files, as needed by the computer 100 for the graphic display 200 as described below.

Referring now to FIG. 2, the graphic display 200 generally includes a subject design layout display 1000, a tile pallet display 4000, and a tool layout display 5000. Referring now to FIGS. 3 and 4, the subject design layout display 1000 is drawn in such a manner to illustrate the components of the subject design layout display 1000. The subject layout design display 1000 includes a canvas layer 2000 and an overlay layer 3000. The canvas layer 2000 has a plurality of tile graphics 2100. The overlay layer 3000 has a plurality of overlay containers 3100; each overlay container 3100 corresponding with a tile graphic 3100 in the canvas layer 3000. The overlay containers 3100 in the overlay layer 3000 each have container zones and an overlay graphic. The overlay layer 3000 is transparent, with the exception of the overlay graphics when activated. As illustrated in FIG. 3, the overlay graphics in all overlay containers the overlay layer 3000 are visible; however, typically only the graphics for single overlay container 3100 would be visible during certain events, as will be described below. Additionally, as illustrated in FIG. 3, the boundaries of the container zones are demonstrated with dashed lines for illustration purposes; however, the boundaries of the container zones are typically not illustrated or visible in the subject design display 1000. In FIG. 4, there is shown the graphic display 200 from FIG. 2, with the overlay graphics for a single overlay container 3100 activated for display.

Referring now to FIGS. 3 and 4, the canvas layer 2000 comprises a plurality of tile graphics 2100 arranged in a grid or matrix. In one embodiment, the canvas layer 2000 is an HTML5 element that is manipulated and controlled via HTML, Javascript, jQuery, and CSS3. Each of the tile graphics 2100 represent a section of the floor layout and are categorized by predetermined tile patterns. Tile graphics 2100 from a particular tile pattern will have a design with common design elements. The tile graphics 2100 are further categorized by color scheme. The tile graphics 2100 of a particular tile pattern and color scheme will have the same design as tile graphics 2100 from the same tile pattern with a different color scheme, but a different use of colors. Additionally, tile graphics 2100 with a particular tile pattern and a particular color scheme can have accents. Accents can be tile graphics 2100 with variations of the colors for the tile pattern with that color scheme, the addition of more tile graphics 2100 in the tile pattern and color scheme (having same tile pattern with variations in the colors of the design), or both.

Still referring to FIGS. 3 and 4, the grid in the canvas layer 2000 can be a conventional square grid with even rows and columns, or an unconventional grid such as an ashlar pattern. In one example of an ashlar pattern, the grid or matrix the rows in a column are offset from the rows of adjacent columns. In another example of an ashlar patter, the columns in a row are offset from the columns of adjacent rows. The tile graphics 2100 are placed in the grid of the canvas layer 2000 with a particular angular orientation or rotational angle 2200. The tile graphics 2100 in the canvas layer 2000 can all be oriented in the same angular direction, or can be oriented different from one tile graphic 2100 to the next in the canvas layer 2000. For example, the tile graphics 2100 in a group of four can be oriented in quarter turn pattern, with each graphic pointing in the same clockwise or counterclockwise direction, with all tile graphics 2100 in alternating rows or columns pointing in opposite directions, or with the tile graphics 2100 randomly oriented throughout the canvas 2000.

Referring still to FIGS. 3 and 4, the overlay layer 3000 comprises a plurality of overlay containers 3100 in a grid or matrix matching the grid or matrix of the tile graphics 2100 in the canvas layer 2000. In one embodiment, the overlay layer 3000 comprises HTML div container elements for the overlay containers 3100, that is manipulated and controlled via HTML, Javascript, jQuery, and CSS3. Each overlay container 3100 corresponds with the tile graphic 2100 with same position in the canvas layer 2000. Each of the overlay containers 3100 include at least one overlay container zone with an associated overlay function. However, the overlay containers 2100 will preferably include multiple overlay container zones, each with an associated overlay function. The overlay functions comprise functions that manipulate the associated tile graphic 2100 in the canvas layer 2000 upon a computer activation event over the container zone associated with the overlay function.

The overlay container zones of the overlay containers 3100 in FIGS. 3 and 4 include a first rotational zone 3111 and a second rotational zone 3112. The overlay functions of the overlay containers 3100 include a first rotational function associated with the first rotational zone 3111 and a second rotational function associated with the second rotational zone 3112. The first rotational function of the overlay container 3100 rotates the orientation of the corresponding tile graphic 2100 in the canvas layer 2000 ninety degrees clockwise when the computer activation event occurs over the first rotational zone 3111 of that overlay container 3100. The second rotational function of the overlay container 3100 rotates the orientation of the corresponding tile graphic 2100 in the canvas layer 2000 ninety degrees counterclockwise when the computer activation event occurs over the second rotational zone 3112 of that overlay container 3100.

The overlay containers 3100 in FIGS. 3 and 4, also include an exchange zone 3113 and an exchange function associated with the exchange zone 3113. The exchange function is operated by the drag event of the computer 120. When the start point of a drag event occurs over the exchange zone 3113 of a first overlay container 3100, the location of the first overlay container 3100 in the overlay layer 3000 and the corresponding tile graphic 2100 in the canvas layer 2000 are placed in a memory of the computer 100. Then, when the finish point of that drag event occurs over the exchange zone 3113 of a subsequent overlay container 3100 the tile graphic 2100 associated with the subsequent overlay container 3100 is replaced with the tile graphic 2100 associated with the first overlay container 3100 and the tile graphic 2100 associated with the first overlay container 3100 is replaced with the tile graphic 2100 associated with the subsequent overlay container 3100. In one embodiment, an image of the first tile graphic 3100 will drag across the graphic display 200 with the drag event until the finish point of that drag event is completed, at which time the dragging image will delete.

Still referring to FIGS. 3 and 4, as illustrated each of the overlay containers 3100 also include overlay graphic that provides graphical information about the overlay container 3100, such as graphical information about the overlay functions. The overlay graphics of the overlay containers 3100 have a first rotational graphic 3131 located in the first rotational zone 3111 of the overlay containers 3100 that points in a clockwise direction, and a second rotational graphic 3132 located in the second rotational zone 3112 of the overlay containers 3100 that point in a counterclockwise direction. The overlay graphics of the overlay containers 3100 also include an exchange graphic 3133 located within the exchange zone 3113. In one embodiment the overlay graphic in each overlay container 3100 include an outline graphic 3134 illustrating the border of the overlay container 3100 in the overlay layer 3100 and associated tile graphic 2100 in the canvas layer 2100. In one embodiment, the overlay graphic of each overlay container 3100 are transparent until a hover event occurs over an overlay container 3100, at which point the overlay graphic of that particular overlay container 3100 become visible. Although the overlay graphics of the overlay containers are described as a single graphic having a first rotational graphic 3131, second rotational graphic 3132, an exchange graphic 3133, and an outline graphic 3134, each of the individual portions of the overlay graphic can be a single graphic by itself. Additionally, one or more of the components of the overlay graphics can be a stylized hover effect using code called out from the programming language.

Referring back now to FIG. 2, the pallet display 4000 is shown adjacent to the subject design layout display 1000 in the graphic display 200 on the monitor 120. In one embodiment, the pallet display 4000 is an HTML5 element that is manipulated and controlled via HTML, Javascript, jQuery, and CSS3. The pallet display 4000 has a tile graphic icon 4100 for each of the tile graphics 2100 in the canvas layer 2000 having a particular tile pattern, color scheme, and accent. A particular tile graphic 2100 may appear more than once in the canvas layer 3000, but will only have one associated tile graphic icon 4100 in the pallet display 4000. The tile graphic icons 4100 are grouped in the pallet display 4000 by a common tile pattern.

Still referring to FIG. 2, in one embodiment the tile graphic icons 4100 in the tile pallet display 4000 can be used as a source for placing tile graphics 2100 into the canvas 2000. In such an embodiment, by activating the start point of a drag event over a graphic tile icon 4100 and then the finish point over an overlay container 3100, the tile graphic 2100 in the location of the canvas grid corresponding with overlay container 3100 for which the finish point occurred is replaced with a tile graphic 2100 associated with the tile graphic icon 4100 for which the start point occurred.

Referring still to FIG. 2, there is shown a tool layout display 5000 adjacent to the subject design layout display 1000 in the graphic display 200. In one embodiment, each of the tools in the tool layout display 5000 comprise an HTML5 element that is manipulated and controlled via HTML, Javascript, jQuery, and CSS3. As illustrated in FIG. 2, the tool layout display 5000 includes tile pattern indicia 5100, color scheme indicia 5200, and accent indicia 5300. The tile pattern indicia 5100 include a representation for each tile pattern available for use in the canvas layer 2100 of the subject design layout display 1000. The color scheme indicia 5200 include indicia for each color scheme available for the tile patterns in the tile pattern indicia 5100. The accent indicia 5300 include indicia for each accent scheme available for each tile pattern and color scheme combination. Each tile pattern will have a default color scheme and accent associated with the particular tile pattern.

Referring now to FIGS. 2 and 3, the tile pattern indicia 5100 can be used to change the tile graphics 2100 in the canvas layer 2000 and the associated tile graphic icons 5100 in the tile pallet display 5000. When the computer activation event occurs over a tile pattern indicia 5100 in the tool layout display 5000, and there are no tile graphics 2100 in the canvas layer 2000 having the tile pattern associated with that tile pattern indicia 5100, the canvas layer 2000 is reconfigured to include the tile graphics 2100 associated with the tile pattern having the default color scheme and default accent scheme and the tile graphic icons 4100 associated with the additional tile graphics 2100 in the canvas 2000 are added to the tile pallet display 4000. When the computer activation event occurs over a tile pattern indicia 5100 in the tool layout display 5000, and the canvas layer 2100 includes tile graphics 2100 having the tile pattern associated with the particular tile pattern indicia 5100, the canvas layer 2000 is reconfigured to without the tile graphics 2100 associated with that tile pattern and the tile graphic icons 4100 associated with the additional tile graphics 2100 are removed from the tile pallet display 4000. In the embodiment illustrated in FIGS. 2 and 3, the tile pattern indicia 5100 includes indicia for all available tile patterns, but indicia for tile patterns not currently in use have a reduced opacity to indicate that the particular pattern is not active or in use.

Referring still to FIGS. 2 and 3, the color scheme indicia 5200 can be used to change the tile graphics 2100 in the canvas layer 2000 and the associated tile graphic icons 5100 in the tile pallet display 5000, to tile graphics 2100 and tile graphic icons 5100 having a the same tile pattern with a different color scheme. To change the color scheme of the tile graphics 2100 in the canvas 2000 and the associated tile graphic icons 4100 in the tile pallet display 4000, the computer activation event is first used to select the tile pattern indicia 5100 of the tile pattern in which the color scheme will be changed. Once the tile pattern indicia 5100 has been selected, activating the computer activation event over the color scheme indicia 5200 representing the desired color scheme will change the tile graphic icons 5100 in the tile pallet display 5100 to representations of the tile graphics 2100 having the particular tile pattern and color scheme and the canvas layer 2000 will be reconfigured to use tile graphics 2100 with the selected tile pattern and selected color scheme. Typically, selection of a new color scheme could only replace the tile graphics 2100 in the canvas 2000 having the tile pattern with tile graphics 2100 having the same tile pattern and a different color scheme, or could redraw the canvas layer 2000 with the selected tile patterns. However, the selection of a new color scheme could result in the tile pattern having fewer or more tile graphics 2100 for that particular color scheme, in which case the canvas layer 2000 will be redrawn using the selected tile graphics 2100.

Still referring to FIGS. 2 and 3, the accent indicia 5300 can be used to change the tile graphics 2100 in the canvas layer 2000 and the associated tile graphic icons 5100 in the tile pallet display 5000 to tile graphics 2100 and tile graphic icons 5100 having the same tile pattern and color scheme, but a different accent scheme. To change the accent scheme of the tile graphics 2100 in the canvas 2000 and the associated tile graphic icons 4100 in the tile pallet display 4000, the tile pattern and color scheme to be changed must first be selected. The tile pattern is selected by activation of a computer activation event over the tile pattern indicia 5100 of the desired tile pattern. The color scheme is then selected by activation of a computer activation event over the color scheme indicia 5200 of the desired color scheme. Once the tile pattern and color scheme have been selected, activation of the computer activation event over the accent scheme indicia 5300 representing the desired accent scheme, will regenerate the canvas layer 2000 using tile graphics 2100 with the selected tile pattern, color scheme, and accent scheme, and the tile graphic icons 5100 in the tile pallet display 5100 will change to representations of the tile graphics 2100 in the canvas layer 2000 after the regeneration. Typically, selection of an accent scheme will result in the tile pattern having more tile graphics 2100 for that particular color scheme and accent scheme, in which case the canvas layer 2000 will be redrawn using the selected tile graphics 2100. Similarly, if the selection of an accent scheme will result in the tile pattern having fewer tile graphics 2100 for that particular color scheme and accent scheme, the canvas layer 2000 will be redrawn using the selected tile graphics 2100. If the selection of an accent scheme results in the same number of tile graphics 2100, the canvas layer 2000 can be redrawn with the selected tile graphics 2100 or could only have the new tile graphics 2100 replace the old tile graphics 2100 in the canvas 2000 that change because of the selection.

Referring still to FIGS. 2 and 3, the tool layout display 5000 further includes tile graphic orientation indicia 5400, or installation method, each with an associated orientation function for each tile graphic orientation indicia 5400. As previously discussed, each of the tile graphics 2100 in the canvas 2000 is oriented in a particular direction. The orientation functions associated with the tile graphic orientation indicia 5400 will rotate the tile graphics 2100 in the canvas layer 2000 according to the orientation function. As illustrated, the tile graphic orientation indicia 5400 include "monolithic" orientation indicia and "random" orientation indicia. A monolithic orientation function associated with the monolithic orientation indicia will align the tile graphics 2100 in the canvas layer 2000 to an orientation with the same direction upon activation of a computer activation event over the monolithic orientation indicia. A random orientation function associated with the random orientation indicia will change the orientation of the tile graphics 2100 in the canvas layer 2000 to a random orientation upon activation of a computer activation event over the random orientation indicia.

Still referring to FIGS. 2 and 3, the tool layout display 5000 further includes tile pattern grouping indicia 5500, or pattern display, with associated grouping functions. As previously discussed, each of the tile graphics 2100 in the canvas 2000 are arranged according to a grid or matrix. The grouping functions arrange the tile graphics 2100 in the grid or matrix of the canvas layer 2000 according to the selected grouping function. As illustrated, the tile pattern grouping indicia 5500 include a "blend" grouping indicia and a "separation" grouping indicia. Upon activation of a computer activation event over the blend grouping indicia the blend grouping function associated with the blend grouping indicia arranges the tile graphics 2100 in random placement within the grid or matrix of the canvas layer 2000 without regard to the tile pattern of the tile graphic 2100. Upon activation of a computer activation function over the separation grouping indicia the separation grouping function associated with the separation grouping indicia arranges the tile graphics 2100 within the grid or matrix of the canvas layer 2000 in groups of common tile patterns. In one embodiment, the separation grouping function organizes the tile graphics 2100 in the grid or matrix of the canvas layer 200 with each column of the grid or matrix having only tile graphics 2100 with a particular tile pattern.

Referring still to FIGS. 2 and 3, the tool layout display 5000 further includes grid size indicia 5600, with an associated grid size function. As previously discussed, each of the tile graphics 2100 in the canvas 2000 are arranged according to a grid or matrix. Upon activation of a computer activation event over a particular grid size indicia 5600, the associated grid size function 5600 will change the size of the grid or matrix in the canvas layer 2000 and the overlay layer 3000 to the grid size according to the grid size indicia 5600, and redraw the canvas layer 2000 and the overlay layer 3000 with the number of tile graphics 2100 and overlay cells 3100 required for the new grid size.

Referring now to FIG. 5, there is shown another embodiment of the graphic display 200 with the subject design layout display 1000 in three dimensional perspective view and having an environmental mask 7000 over the subject design layout display 1000. As with the subject design layout 1000 in FIG. 2, in one embodiment the subject design layout display 1000 and environmental mask 7000 FIG. 5 comprise an HTML5 element that is manipulated and controlled via HTML, Javascript, jQuery, and CSS3. The environmental mask 7000 has a perspective graphic design representing a room layout 7100, as illustrated in FIG. 6, with a transparent window 7200 in the region represented by the floor of the room. The environmental mask 7000 is disposed over the subject design layout, or floor layout, design 1000 appearing through the transparent window 7200. As illustrated in FIG. 7, the subject layout display (or floor layout display) 1000 includes the same canvas layer 2000 and overlay layer 3000 as described above with association with FIGS. 2 through 4 above, with the same features and functions, but with the grid or matrix of the canvas layer 2000 and overlay layer 3000 in perspective view. The graphic display 200 illustrated in FIG. 5 also includes the tile pallet display 4000 with the same features and functions as described above in association with FIG. 2 above. The graphic display 200 illustrated in FIG. 5 further includes an alternative tool layout display 5000'.

Still referring to FIG. 5, the alternative tool layout display 5000' includes the same tile layout indicia 5100, color scheme indicia 5200, accent indicia 5300, tile graphic orientation indicia 5400, and tile pattern indicia 5500 as the tool layout display 5000 in FIG. 2, with the same features and functions. However, the alternative tool layout display 5000' in FIG. 5 does not include the grid size indicia 5600. The alternative tool layout display 5000' in FIG. 5 does include environmental mask indicia 5700. The environmental mask indicia 5700 represent different environmental masks 7000 for use in the subject design layout display 1000, each environmental mask 7000 having a different perspective room design 7100 and transparent window 7200 in which to display the floor layout 1000. As illustrated, the environmental mask indicia 5700 include indicia for an open office, a reception room, an elevator lobby, and a small and large conference room. Upon activation of a computer activation event over a particular environmental mask indicia 5700, the environmental mask 7000 in the graphic display 200 is changed to an environmental mask having a room design 7100 and transparent window 7200 associated with the particular environmental mask indicia 5700, and the canvas layer 2000 and overlay layer 3000 of the flooring layout display 1000 are changed to a predetermined grid size and location specified in association with the selected environmental mask 7000.

Thus, this invention includes an interactive single display comprising a configurable floor plan layout matrix (e.g. main carpet tile display area). The floor layout matrix may be customized by the end-user. For example, a default layout matrix may be 12×10, but it may also be customized to a maximum of 20×20, a minimum of 4×4, and any matrix sizes in between. Other customization options include masking off areas of the floor plan, such as columns and other excluded areas.

Additionally, multiple design collections of carpet tiles are achievable. These collections may reside together within a single display area. Collection integrity is also maintained regardless of layouts being contiguous or in separate areas.

Each design collection may occupy a user defined and customizable area. The area may be contiguous or separated within the main layout. The layout is arranged according to its pattern design matrix (e.g. 4×4, 3×3, etc.) within its user defined area. The design collection may be re-colored by dragging and dropping colors from its associated color palette. Design collections may be dynamically reconfigured according to its rule sets (Monolithic, Random, Quarter-Turn, Ashlar, etc.).

All carpet tiles in the display can be individually manipulated by the end-user. According to each collection/design rule set, the carpet tiles in the display may be rotated in 90 degree increments. They may be dragged and/or swapped within its collection boundaries.

The end-user can further custom design the carpet tiles display. For example, the end-user can overlay the supplied furniture symbols to simulate a planned environment. Or, the end-user may dynamically create a custom install map to help with installation planning. The custom designed space may be saved by the end-user as a "jpg" graphic file for use in other design and/or communication applications. A "tear sheet" may be printed by the end-user that defines which tiles are used with product identification in order to expedite the ordering process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method of generating a graphic display on a monitor of a computer system, the computer system including a hover event, a drag event with a start point activation and a finish point activation, and a computer activation event for the graphic display, the method comprising the steps of:
   displaying in the graphic display on the monitor a subject design layout comprising:
      a canvas layer having tile graphics arranged according to a predetermined grid,
      an overlay layer having overlay containers arranged in a grid correlating to the grid of tile graphics on the canvas layer, each overlay container being associated with the tile graphic located in a corresponding location of the canvas layer, each overlay container having overlay functions and an overlay graphic, the overlay functions in each overlay container comprising:
         a first rotational function associated with a first rotational zone of the overlay container; and
         an exchange function associated with an exchange zone of the overlay container, and
      the overlay graphics in each overlay container including a first rotational graphic positioned in the first rotational zone of the overlay container,
      the overlay graphic in each overlay container being transparent until the hover occurs over the associated overlay container,
   wherein the tile graphic associated with a particular overlay container is rotated a predetermined amount in a first direction when the computer activation event occurs over the first rotational zone of the associated overlay container, and
   wherein the tile graphic associated with a first overlay container in which the finish point activation of the drag event occurs is exchanged with the tile graphic associated with a second overlay container in which the start point activation of the drag event occurred; and
   further including the step of displaying a tool layout display in the graphic display, the tool layout display comprising a tile graphic orientation indicia, wherein occurrence of the computer activation event over the tile graphic orientation icon changes the angular direction of the tile graphics in the canvas layer to a non-uniform random direction.

2. The method according to claim 1, wherein the overlay graphics further include an outline graphic illustrating the border of the associated tile graphic.

3. The method according to claim 1, wherein the overlay graphics further comprise an exchange graphic located in the exchange zone of the overlay container.

4. The method according to claim 1, where in the grid for the tile graphics in the canvas layer and the overlay cells in the overlay layer is an ashlar grid.

5. The method according to claim 1, wherein the overlay functions of each overlay container further comprise a second rotational function located in a second rotational zone of the overlay container and the overlay graphics of the associated overlay container further comprise a second rotational graphic located in the second rotational zone, and wherein the tile graphic associated with a particular overlay container is rotated in a second direction when the computer activation event occurs over the second rotational zone of the associated overlay container.

6. The method according to claim 1, further including the step of displaying a tile pallet display in the graphic display, the tile pallet display containing tile graphic icons representing a set of potential tile graphics for the canvas layer of the subject design layout, wherein the tile graphic associated with an overlay container in which the finish point of the drag event occurs is exchanged with the tile graphic associated with a tile graphic icon in which the start point of drag event has occurred.

7. The method according to claim 1, further including the step of displaying a tile pallet display in the graphic display, the tile pallet display containing tile graphic icons representing the tile graphics in the canvas layer of the subject design layout, the tile graphic icons being in groups of related tile patterns.

8. The method according to claim 7, wherein the tile graphics of each tile pattern are grouped together in the canvas layer by column.

9. The method according to claim 7, further including the step of displaying a tool layout display in the graphic display, the tool layout display comprising a plurality of tile pattern indicia with each tile pattern indicia representing a different tile pattern and each color scheme indicia representing different color schemes for each tile pattern, and further including the steps of selecting a tile pattern indicia and, upon selection of a color scheme indicia by occurrence of the computer activation event over the color scheme indicia, changing the graphic tiles in the canvas layer associated with the selected tile pattern to graphic tiles associated with the same tile pattern having the color scheme indicated by the selected color scheme indicia and changing the tile graphic icons in the tile pallet display associated with the selected tile pattern to tile graphic icons associated with the same tile pattern having the color scheme indicated by the selected color scheme indicia.

10. The method according to claim 7, further including the step of displaying a tool layout display in the graphic display, the tool layout display comprising tile pattern indicia with each tile pattern indicia representing a different tile pattern, and further including the step of, upon occurrence of the computer activation event over a particular tile indicia, removing from the tile pallet display the tile icons associated with that tile pattern indicia and replacing the tile graphics in the canvas layer of the subject design layout with tile graphics associated with the remaining tile graphic icons remaining in the tile pallet display.

11. The method according to claim 7, further including the step of displaying a tool layout display in the graphic display, the tool layout display comprising tile pattern indicia with each tile pattern indicia representing a different tile pattern, and further including the step of, upon occurrence of the computer activation event over a particular tile indicia, adding to the tile pallet display the tile icons associated with the selected tile pattern indicia and replacing the tile graphics in the canvas layer of the subject design layout with tile graphics associated with the tile graphic icons in the tile pallet display.

12. The method according to claim 1, further including the step of displaying a tool layout display in the graphic display on the monitor, the tool layout display comprising a tile pattern grouping indicia, wherein occurrence of the computer activation event over the tile pattern grouping indicia changes the placement of tile graphics in the canvas layer to a non-uniform random placement in the grid of the canvas layer.

13. The method according to claim 1, further including the step of displaying a tool layout display in the graphic display on the monitor, the tool layout display comprising a tile pattern grouping indicia, wherein occurrence of the computer activation event over the tile pattern grouping indicia changes the placement of tile graphics in the canvas layer into groups by tile pattern in the grid of the canvas layer.

14. The method according to claim 1, further including the step of displaying a tool layout display in the graphic display on the monitor, the tool layout display comprising a tile pattern grouping indicia, wherein occurrence of the computer activation event over the tile pattern grouping indicia changes the placement of tile graphics in the canvas layer into groups by tile pattern in the grid of the canvas layer, the groups being columns in the grid of the canvas layer with each column containing only the tile graphics from a single tile pattern.

15. The method according to claim 1, further including the step of displaying a tool layout display in the graphic display on the monitor, the tool layout display comprising a plurality of grid size indicia, wherein occurrence of the computer activation event over a particular grid size indicia changes the size of the grid of the canvas layer and the overlay layer to a grid size associated with the particular grid size indicia.

16. A method of generating a graphic display on a monitor of a computer system, the computer system including a hover event, a drag event with a start point activation and a finish point activation, and a computer activation event for the graphic display, the method comprising the steps of:
  displaying in the graphic display on the monitor a subject design layout comprising:
    a canvas layer having tile graphics arranged according to a predetermined grid,
    an overlay layer having overlay containers arranged in a grid correlating to the grid of tile graphics on the canvas layer, each overlay container being associated with the tile graphic located in a corresponding location of the canvas layer, each overlay container having overlay functions and an overlay graphic, the overlay functions in each overlay container comprising:
      a first rotational function associated with a first rotational zone of the overlay container; and
      an exchange function associated with an exchange zone of the overlay container, and
    the overlay graphics in each overlay container including a first rotational graphic positioned in the first rotational zone of the overlay container,
    the overlay graphic in each overlay container being transparent until the hover occurs over the associated overlay container,
  wherein the tile graphic associated with a particular overlay container is rotated a predetermined amount in a first direction when the computer activation event occurs over the first rotational zone of the associated overlay container, and
  wherein the tile graphic associated with a first overlay container in which the finish point activation of the drag event occurs is exchanged with the tile graphic associated with a second overlay container in which the start point activation of the drag event occurred; and
  further including the step of displaying a tool layout display in the graphic display on the monitor, the tool layout display comprising a tile pattern grouping indicia, wherein occurrence of the computer activation event over the tile pattern grouping indicia changes the placement of tile graphics in the canvas layer to a non-uniform random placement in the grid of the canvas layer.

17. The method according to claim 16, wherein the overlay graphics further include an outline graphic illustrating the border of the associated tile graphic.

18. The method according to claim 16, wherein the overlay graphics further comprise an exchange graphic located in the exchange zone of the overlay container.

19. The method according to claim 16, where in the grid for the tile graphics in the canvas layer and the overlay cells in the overlay layer is an ashlar grid.

20. The method according to claim 16, wherein the overlay functions of each overlay container further comprise a second rotational function located in a second rotational zone of the overlay container and the overlay graphics of the associated overlay container further comprise a second rotational graphic located in the second rotational zone, and wherein the tile graphic associated with a particular overlay container is rotated in a second direction when the computer activation event occurs over the second rotational zone of the associated overlay container.

21. The method according to claim 16, further including the step of displaying a tile pallet display in the graphic display, the tile pallet display containing tile graphic icons representing a set of potential tile graphics for the canvas layer of the subject design layout, wherein the tile graphic associated with an overlay container in which the finish point of the drag event occurs is exchanged with the tile graphic associated with a tile graphic icon in which the start point of drag event has occurred.

22. The method according to claim 16, further including the step of displaying a tile pallet display in the graphic display, the tile pallet display containing tile graphic icons representing the tile graphics in the canvas layer of the subject design layout, the tile graphic icons being in groups of related tile patterns.

23. The method according to claim 22, wherein the tile graphics of each tile pattern are grouped together in the canvas layer by column.

24. The method according to claim 22, further including the step of displaying a tool layout display in the graphic display, the tool layout display comprising a plurality of tile pattern indicia with each tile pattern indicia representing a different tile pattern and each color scheme indicia representing different color schemes for each tile pattern, and further including the steps of selecting a tile pattern indicia and, upon selection of a color scheme indicia by occurrence of the computer activation event over the color scheme indicia, changing the graphic tiles in the canvas layer associated with the selected tile pattern to graphic tiles associated with the same tile pattern having the color scheme indicated by the selected color scheme indicia and changing the tile graphic icons in the tile pallet display associated with the selected tile pattern to tile graphic icons associated with the same tile pattern having the color scheme indicated by the selected color scheme indicia.

25. The method according to claim 22, further including the step of displaying a tool layout display in the graphic display, the tool layout display comprising tile pattern indicia with each tile pattern indicia representing a different tile pattern, and further including the step of, upon occurrence of the computer activation event over a particular tile indicia, removing from the tile pallet display the tile icons associated with that tile pattern indicia and replacing the tile graphics in the canvas layer of the subject design layout with tile graphics associated with the remaining tile graphic icons remaining in the tile pallet display.

26. The method according to claim 22, further including the step of displaying a tool layout display in the graphic display, the tool layout display comprising tile pattern indicia with each tile pattern indicia representing a different tile pattern, and further including the step of, upon occurrence of the computer activation event over a particular tile indicia, adding to the tile pallet display the tile icons associated with the selected tile pattern indicia and replacing the tile graphics in the canvas layer of the subject design layout with tile graphics associated with the tile graphic icons in the tile pallet display.

27. The method according to claim 16, further including the step of displaying a tool layout display in the graphic display, the tool layout display comprising a tile graphic orientation indicia, wherein occurrence of the computer activation event over the tile graphic orientation icon changes the angular direction of the tile graphics in the canvas layer to a non-uniform random direction.

28. The method according to claim 16, further including the step of displaying a tool layout display in the graphic display, the tool layout display comprising tile graphic orientation indicia, wherein occurrence of the computer activation event over the tile graphic orientation icon changes the angular direction of the tile graphics in the canvas layer to a uniform direction.

29. The method according to claim 16, further including the step of displaying a tool layout display in the graphic display on the monitor, the tool layout display comprising a tile pattern grouping indicia, wherein occurrence of the computer activation event over the tile pattern grouping indicia changes the placement of tile graphics in the canvas layer into groups by tile pattern in the grid of the canvas layer.

30. The method according to claim 16, further including the step of displaying a tool layout display in the graphic display on the monitor, the tool layout display comprising a tile pattern grouping indicia, wherein occurrence of the computer activation event over the tile pattern grouping indicia changes the placement of tile graphics in the canvas layer into groups by tile pattern in the grid of the canvas layer, the groups being columns in the grid of the canvas layer with each column containing only the tile graphics from a single tile pattern.

31. The method according to claim 16, further including the step of displaying a tool layout display in the graphic display on the monitor, the tool layout display comprising a plurality of grid size indicia, wherein occurrence of the computer activation event over a particular grid size indicia changes the size of the grid of the canvas layer and the overlay layer to a grid size associated with the particular grid size indicia.

* * * * *